US010628567B2

United States Patent
Aronowitz

(10) Patent No.: US 10,628,567 B2
(45) Date of Patent: Apr. 21, 2020

(54) USER AUTHENTICATION USING PROMPTED TEXT

(71) Applicant: International Business Machines Corporation, Armonk, NY (US)

(72) Inventor: Hagai Aronowitz, Petach-Tikva (IL)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 15/256,632

(22) Filed: Sep. 5, 2016

(65) Prior Publication Data

US 2018/0068102 A1 Mar. 8, 2018

(51) Int. Cl.
| | |
|---|---|
| G06F 21/32 | (2013.01) |
| H04L 29/06 | (2006.01) |
| G10L 17/04 | (2013.01) |
| G10L 17/06 | (2013.01) |
| G10L 17/24 | (2013.01) |

(52) U.S. Cl.
CPC ............ *G06F 21/32* (2013.01); *G10L 17/04* (2013.01); *G10L 17/06* (2013.01); *G10L 17/24* (2013.01); *H04L 63/0861* (2013.01); *H04L 63/123* (2013.01)

(58) Field of Classification Search
CPC ......... G06F 21/32; G10L 17/04; G10L 17/06; G10L 17/24; H04L 63/0861; H04L 63/123
See application file for complete search history.

(56) References Cited

U.S. PATENT DOCUMENTS

| | | | |
|---|---|---|---|
| 6,496,800 B1 * | 12/2002 | Kong | G10L 17/24 704/239 |
| 7,562,019 B2 | 7/2009 | Cohen et al. | |
| 7,735,124 B2 * | 6/2010 | Lin | G07C 9/00142 726/16 |
| 8,694,315 B1 | 4/2014 | Sheets et al. | |
| 9,092,781 B2 * | 7/2015 | Schultz | G06Q 20/3674 |
| 9,350,548 B2 * | 5/2016 | Bagley | H04L 9/3242 |

(Continued)

OTHER PUBLICATIONS

Aronowitz et al ("Aronowitz," "New Developments in Voice Biometrics for User Authentication," Interspeech Aug. 28-31, 2011, Florence Italy, pp. 17-20).*

(Continued)

Primary Examiner — Luu T Pham
Assistant Examiner — James J Wilcox
(74) Attorney, Agent, or Firm — Daniel Kligler

(57) ABSTRACT

Methods, computing systems and computer program products implement embodiments of the present invention that include defining a verification string including a sequence of verification characters and a delimiter character between each sequential pair of the verification characters, the delimiter character being different from the verification characters. The verification string to a user, and upon receiving, from the user, a series of verification vocal inputs in response to presenting the verification string, a set of verification features from each of the verification vocal inputs are computed so as to generate sets of verification features. A one-to-one correspondence is established between each of the verification vocal inputs and each of the verification characters, and the user is authenticated based on the verification vocal inputs and their corresponding sets of verification features.

17 Claims, 3 Drawing Sheets

(56) References Cited

U.S. PATENT DOCUMENTS

| | | | | |
|---|---|---|---|---|
| 2005/0273624 A1* | 12/2005 | Serpa | ................... | G06F 21/31 713/183 |
| 2007/0121813 A1* | 5/2007 | Skinner | ................ | G06Q 20/00 379/80 |
| 2007/0162745 A1* | 7/2007 | Ginzburg | ................ | G06F 21/36 713/159 |
| 2007/0226784 A1* | 9/2007 | Ueda | .................... | G06F 21/36 726/5 |
| 2010/0114573 A1 | 5/2010 | Huang et al. | | |
| 2010/0115114 A1* | 5/2010 | Headley | ................ | G06F 21/32 709/229 |
| 2010/0257410 A1* | 10/2010 | Cottrell | .............. | G05B 23/0229 714/45 |
| 2010/0299143 A1* | 11/2010 | Takeda | ................ | G10L 15/065 704/10 |
| 2012/0203553 A1* | 8/2012 | Maruta | ................ | G10L 15/06 704/260 |
| 2013/0158999 A1* | 6/2013 | Maruta | .............. | G01C 21/3608 704/252 |
| 2014/0081640 A1 | 3/2014 | Farrell et al. | | |
| 2014/0342667 A1* | 11/2014 | Aarnio | ................ | H04W 12/06 455/41.2 |
| 2015/0326571 A1* | 11/2015 | Gomar | ................ | H04W 12/06 726/6 |
| 2016/0057261 A1* | 2/2016 | Bang | ................ | H04M 1/271 455/563 |
| 2017/0279790 A1* | 9/2017 | Ogawa | ................ | G06F 21/34 |
| 2019/0124078 A1* | 4/2019 | Jameel | ................ | H04L 63/0861 |
| 2019/0272831 A1* | 9/2019 | Kajarekar | .............. | G10L 15/22 |

OTHER PUBLICATIONS

Humm—"Combined Handwriting and Speech Modalities for User Authentication," IEEE Transactions on Systems, Man and Cybernetics—Part A: Systems and Humans, vol. 39, No. 1, Jan. 2009, pp. 25-35 (Year: 2009).*

De Leon—"Synthetic Speech Detection Based on Selected Word Discriminators," 2013, pp. 3004-3008 (Year: 2013).*

K. Singh et al., "Features and Techniques for Speaker Recognition", M. Tech. Credit Seminar Report, Electronic Systems Group, EE Dept, IIT Bombay submitted Nov. 2003.

* cited by examiner

USER AUTHENTICATION USING PROMPTED TEXT

FIELD OF THE INVENTION

The present invention relates generally to speech recognition, and specifically to a robust and portable design for user authentication using prompted text.

BACKGROUND

Speaker recognition (also known as user or voice recognition) is a biometric modality that uses an individual's voice for recognition purposes. The speaker recognition process typically relies on features influenced by both the physical structure of an individual's vocal tract and the behavioral characteristics of the individual. Due to the availability of devices for collecting speech samples (e.g., telephone network and computer microphones) and its ease of integration, speaker recognition can be used for remote user authentication.

The description above is presented as a general overview of related art in this field and should not be construed as an admission that any of the information it contains constitutes prior art against the present patent application.

SUMMARY

There is provided, in accordance with an embodiment of the present invention a method, including defining a verification string including a sequence of verification characters and a delimiter character between each sequential pair of the verification characters, the delimiter character being different from the verification characters, presenting the verification string to a user, receiving, from the user, a series of verification vocal inputs in response to presenting the verification string, computing a set of verification features from each of the verification vocal inputs so as to generate sets of verification features, establishing a one-to-one correspondence between each of the verification vocal inputs and each of the verification characters, and authenticating the user based on the verification vocal inputs and their corresponding sets of verification features.

There is also provided, in accordance with an embodiment of the present invention an apparatus, including a display, and a processor configured to define a verification string including a sequence of verification characters and a delimiter character between each sequential pair of the verification characters, the delimiter character being different from the verification characters, to present, on the display, the verification string to a user, to receive, from the user, a series of verification vocal inputs in response to presenting the verification string, to compute a set of verification features from each of the verification vocal inputs so as to generate sets of verification features, to establish a one-to-one correspondence between each of the verification vocal inputs and each of the verification characters, and to authenticate the user based on the verification vocal inputs and their corresponding sets of verification features.

There is further provided, in accordance with an embodiment of the present invention a computer program product, the computer program product including a non-transitory computer readable storage medium having computer readable program code embodied therewith, the computer readable program code including computer readable program code configured to define a verification string including a sequence of verification characters and a delimiter character between each sequential pair of the verification characters, the delimiter character being different from the verification characters, computer readable program code configured to present the verification string to a user, computer readable program code configured to receive, from the user, a series of verification vocal inputs in response to presenting the verification string, computer readable program code configured to compute a set of verification features from each of the verification vocal inputs so as to generate sets of verification features, computer readable program code configured to establish a one-to-one correspondence between each of the verification vocal inputs and each of the verification characters, and computer readable program code configured to authenticate the user based on the verification vocal inputs and their corresponding sets of verification features.

BRIEF DESCRIPTION OF THE DRAWINGS

The disclosure is herein described, by way of example only, with reference to the accompanying drawings, wherein.

DETAILED DESCRIPTION OF EMBODIMENTS

Figure 1:
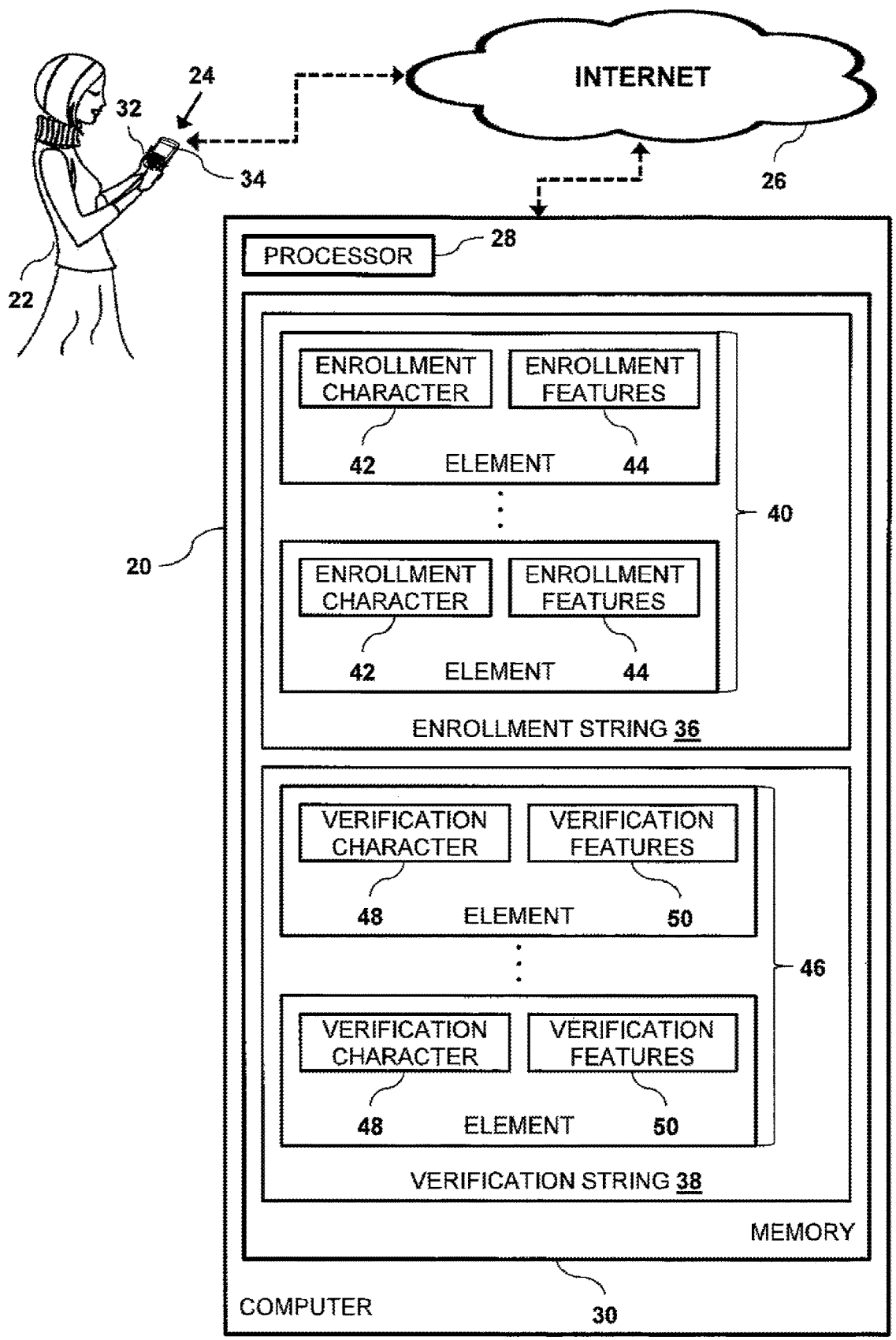
FIG. 1 is a block diagram that schematically illustrates a computer system configured to implement a user authentication system, in accordance with an embodiment of the present invention.

When authenticating a user's voice, automatic speaker recognition techniques can be used to recognize a common passphrase (such as "my voice is my password"). Since a common passphrase is vulnerable to a simple playback attack, authentication techniques typically prompt the user to recite random text (usually a random digit string) in order to verify the user's identity. To verify the user, speaker recognition techniques can be applied to authenticate the user, and automatic speech recognition (ASR) techniques can be applied to verify the lexical content (i.e., the prompted text) correctness. Common problems encountered when using ASR techniques to authenticate text spoken by the user include:

- Difficulties in accurately authenticating the user due to coarticulation (a digit sounds different in different contexts).
- Spoken ambiguities such as receiving "two four" and "twenty four" in response to prompting the user with the digits "24". These ambiguities degrade both user-identification and ASR accuracies.
- ASR is an expensive technology and is language dependent (i.e., different ASR engines are typically required for each supported language).
- ASR is not 100% accurate.
- In order to achieve reasonable accuracy, the length of the digit string is long (e.g., weight digits), which decreases usability.

Embodiments of the present invention provide methods and systems for using prompted text to implement a robust and portable design for user authentication. As described hereinbelow, a verification string is constructed comprising a sequence of verification characters and a delimiter character between each sequential pair of the verification characters, the delimiter character being different from the verification characters. The verification string is presented to a user, and upon receiving, from the user, a series of verification vocal inputs in response to presenting the verification string, a set of verification features is computed for each of the verification vocal inputs so as to generate sets of verification features. A one-to-one correspondence between each of the verification vocal inputs and each of the verification characters is established, and the user can be authenticated based on the verification vocal inputs and their corresponding sets of verification features.

In operation, a user can be instructed to separate the different alphanumeric characters with delimiters such as dashes ("-""), periods (".") or commas (","). For example, a user can be prompted with "4-2-3-4-1-5" and is supposed to say "four dash two dash three dash four dash one dash five", in order to pass verification. Advantages of systems implementing embodiments of the present invention include:

Since coarticulation mainly affects the delimiters, user verification can be improved since the coarticulation impact on the alphanumeric characters is minimal.

Improved user verification and ASR accuracy due to less ambiguity. For example, there is less of a chance that a user will utter "twenty" in response to seeing the prompt "2-0".

Instead of requiring a full-fledged expensive language-dependent model, a light-weight alphanumeric character recognizer based on either a hidden Markov model (HMM) or a dynamic time warping (DTW) model coupled with a segmenter that recognizes the delimiter (e.g., dashes) can be used. This recognizer is trained on the same small training set (described hereinbelow) that is used to train the user authentication system. This also enables easily porting additional languages to the system.

Instead of requiring an eight element (i.e., digits and/or characters) string, the string can be shortened (e.g., to 4-6 elements) because of (a) the reduced coarticulation impact described supra, (b) the lower ambiguity described supra, and (c) delimiters providing more audio for user verification (i.e., authentication).

FIG. 1 is a block diagram that schematically illustrates a computer 20 configured to verify a user 22 via vocal inputs (i.e., spoken by the user), in accordance with an embodiment of the present invention. In the configuration shown in FIG. 1, the user interacts with computer 20 via a wireless communication device (e.g., a cellular phone) that communicates with computer 20 over an Internet connection 26.

Computer 20 comprises a processor 28 and a memory 30, and device 24 comprises a microphone 32 and a display 34. Memory 30 stores an enrollment string 36 and a verification string 38. Enrollment string 36 comprises multiple enrollment string elements 40, each of the enrollment string elements comprising an enrollment character 42 and enrollment features 44. Verification string 38 comprises multiple verification string elements 46, each of the verification string elements comprising a verification character and verification features 50. Enrollment string 36 and verification string 38 are described in the description referencing FIGS. 2 and 3 hereinbelow.

Processor 28 comprises a general-purpose central processing unit (CPU) or a special-purpose embedded processor, which are programmed in software or firmware to carry out the functions described herein. The software may be downloaded to computer 20 in electronic form, over a network, for example, or it may be provided on non-transitory tangible media, such as optical, magnetic or electronic memory media. Alternatively, some or all of the functions of processor 28 may be carried out by dedicated or programmable digital hardware components, or using a combination of hardware and software elements. Examples of memory 30 include dynamic random-access memories and non-volatile random-access memories.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

User Enrollment and Authentication

Figure 2:
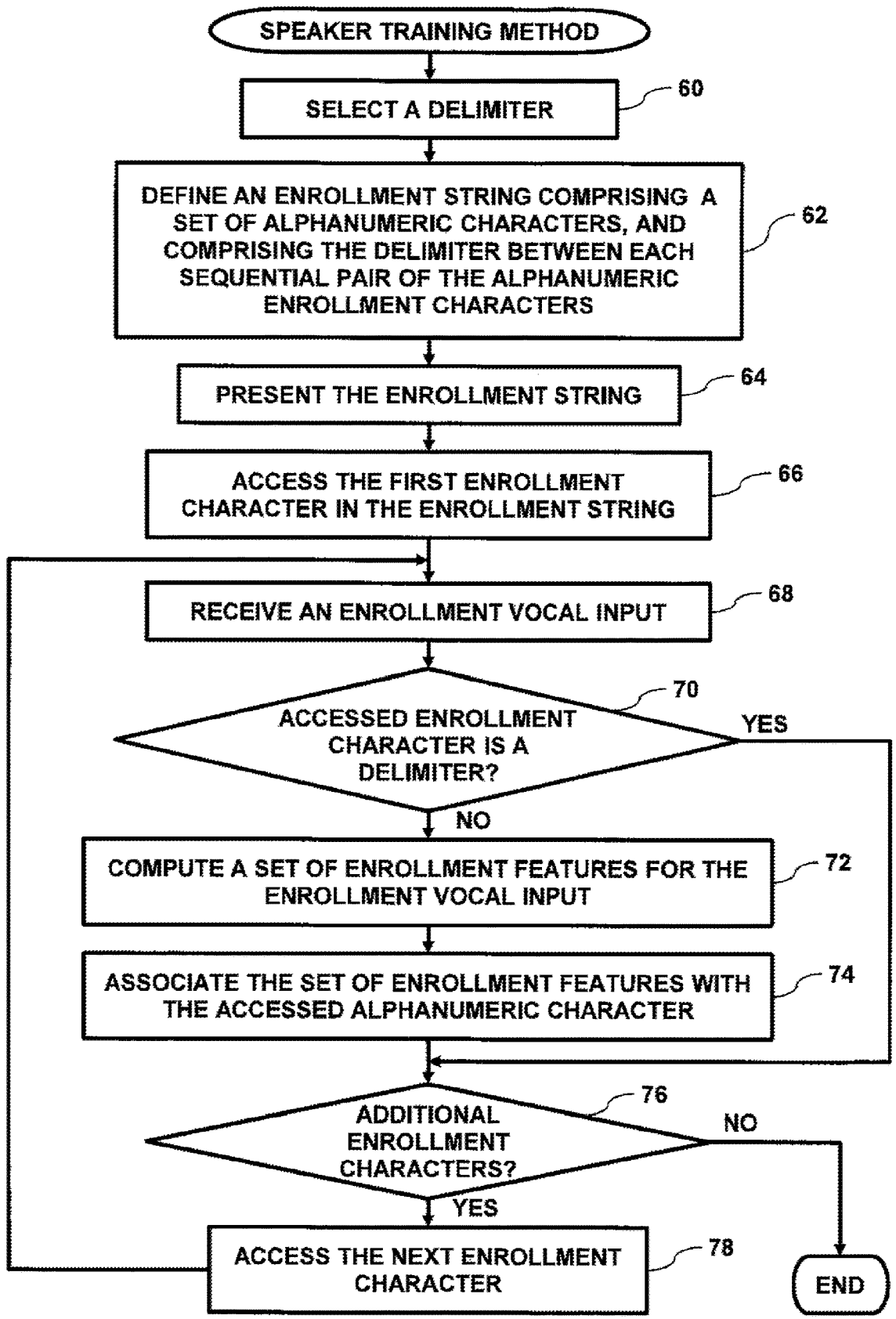
FIG. 2 is a flow diagram that schematically illustrates a method of training the user authentication system for a user, in accordance with an embodiment of the preset invention.

FIG. 2 is a flow diagram that schematically illustrates a method of training computer 20 to recognize a passphrase uttered by user 22, in accordance with an embodiment of the present invention. As explained hereinbelow, user 22 trains computer 20 by speaking (i.e., uttering) enrollment characters 42 in enrollment string 36.

In a selection step 60, processor 28 selects a delimiter, and in a definition step 62, the processor defines enrollment string 36. In some embodiments, processor 28 can select the delimiter and can define enrollment string 36 by receiving input from a system administrator (not shown) or by retrieving data from a configuration file (not shown).

In embodiments of the present invention, enrollment string 36 comprises a sequence of characters that processor 28 stores to enrollment characters 42 in the enrollment string. The sequence of characters typically comprises a sequence of alphanumeric characters (sometime unique), wherein each sequential pair of the alphanumeric characters (i.e., in the sequence) is separated in the enrollment string by the delimiter that is typically different any of the alphanumeric characters in the sequence. Examples of enrollment string 36 include "3-5-8" where "358" is the sequence of characters and "-" is the delimiter, "A.9" where "A9" is the sequence of characters and "." is the delimiter and "8*6" where "86" is the sequence of characters and "*" is the delimiter.

In a presentation step 64, processor 28 presents enrollment string 36 to user 22. In the configuration shown in FIG. 1, processor 28 presents enrollment string 36 by conveying the enrollment string to device 24, which then presents the sequence the enrollment string 36 to user 22 on display 34.

In a first access step 66, processor 28 accesses the first enrollment character 42 (i.e., in the first enrollment element 40) in enrollment string 36, and in a receiving step 68, the processor receives an enrollment vocal input from user 22. In the configuration shown in FIG. 1, user 22 speaks into microphone 32, and device 24 generates and conveys the enrollment vocal input to computer 20.

In a first comparison step 70, if the accessed enrollment character comprises a given character in the sequence of characters defined in step 62 (i.e., the accessed enrollment character does not match the delimiter), then processor 28 computes a set of enrollment features 44 for the accessed enrollment character (i.e., from the received enrollment vocal input) in a computation step 72, thereby generating multiple sets of the enrollment features, and then associates the computed set of enrollment features with the accessed enrollment character in an association step 74. In the configuration shown in FIG. 1, each enrollment element 40 comprises a given enrollment character 42 and its associated set of enrollment features 44. In other words, processor 28 establishes a one-to-one correspondence between each of the enrollment characters and each of the enrollment features. Examples of the computed enrollment features include, but are not limited to, Intensity, Linear Predictive Coding (LPC), Perceptional Linear Predictive Coefficients (PLP), Mel-Frequency Cepstral Coefficients (MFCC), Linear Prediction Cepstral Coefficients (LPCC), Wavelet Based Features and Non-Negative Matrix Factorization features.

In a second comparison step 76, if there are additional enrollment characters 42 in the enrollment string that have not yet been accessed, then in a second access step 78, processor 28 accesses the enrollment character 42 in enrollment string the method continues with step 68. However, if there are no additional enrollment characters 42 in the enrollment string, then the method ends. Returning to step 70, if the accessed enrollment character matches the delimiter, then the method continues with step 76.

Figure 3:
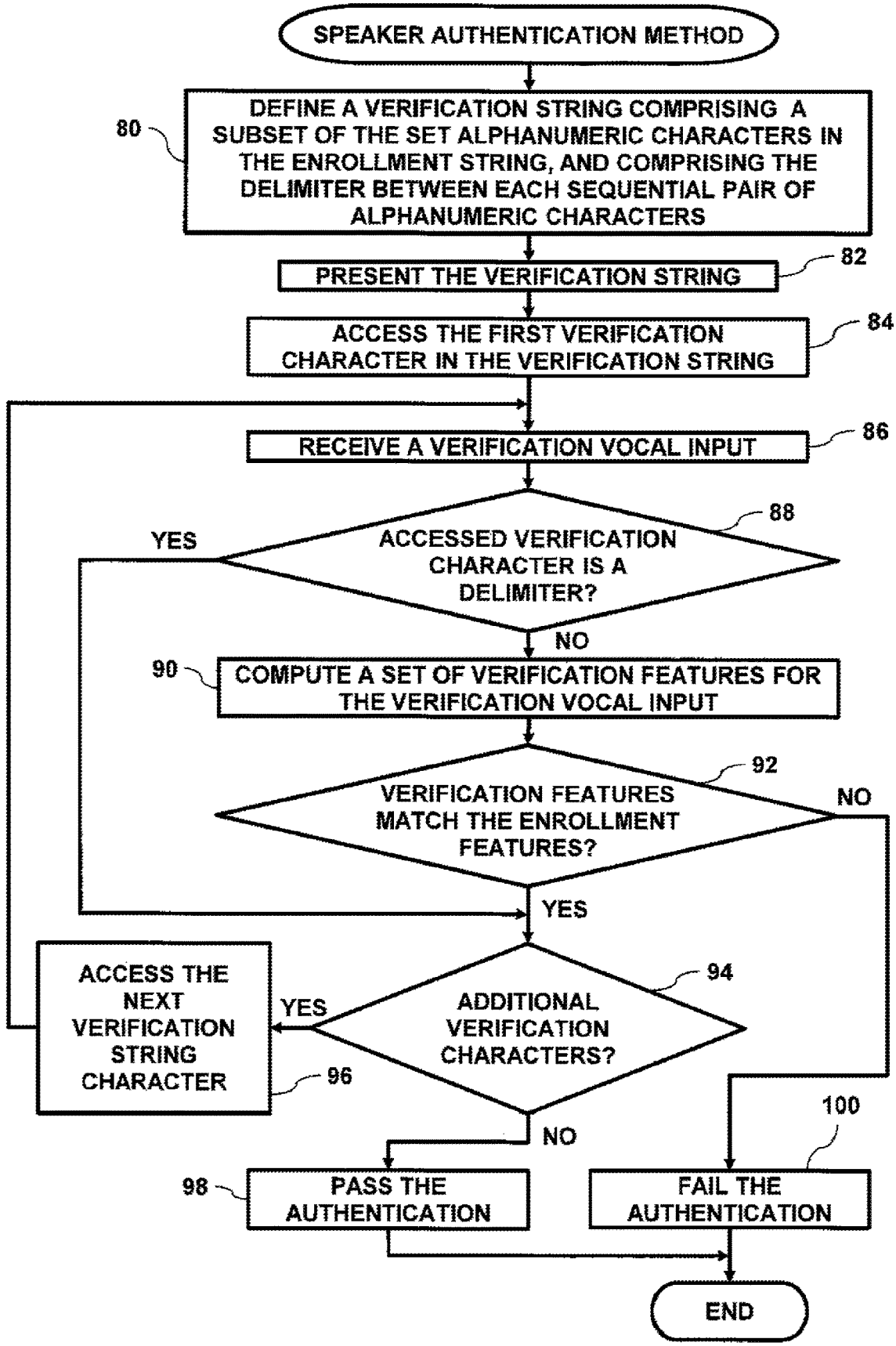
FIG. 3 is a flow diagram that schematically illustrates a method of authenticating the user, in accordance with an embodiment of the preset invention.

FIG. 3 is a flow diagram that schematically illustrates a method of authenticating user 22, in accordance with an embodiment of the present invention. In a definition step 80, processor 28 defines verification string 38. In embodiments of the present invention, verification string 38 comprises a sequence of verification characters that processor 28 stores to enrollment characters 42 in the enrollment string, wherein each of the selected characters matches a given enrollment character 42, and wherein each sequential pair of the selected verification characters is separated by a delimiter. In other words, the verification characters in the verification string are a subset of the enrollment characters in the enrollment string For example, if the enrollment string comprises "1-2-3-4-5-6", then the verification string can be "6-4-2", where the delimiter is "-" in both the enrollment and the verification strings. In some embodiments, a given enrollment character 42 may appear more than once in the verification string.

In a presentation step 82, processor 28 presents verification string 38 to user 22, and in a first access step 84, the processor accesses the first verification character 48 in the verification string. In the configuration shown in FIG. 1, processor 28 presents verification string 38 by conveying the verification string to device 24, and upon receiving the verification string, the wireless communication device presents the verification string on display 34 to user 22.

In a receive step 86, processor 28 receives a verification vocal input from user 22. In the configuration shown in FIG. 1, processor 28 receives the verification vocal input from device 24, which generates the verification vocal input in response to user 22 speaking into microphone 32.

In a first comparison step 88, if the accessed verification character is not a delimiter (i.e., the accessed verification character comprises one of the selected characters), then processor 28 computes a set of verification features 50 from the received verification vocal input for the accessed verification character in a computation step 90, thereby generating multiple sets of the verification features, and then associates the computed set of verification features with the accessed verification character. In the configuration shown in FIG. 1, each verification element 46 comprises a given verification character 48 and its associated set of verification features 50. In other words, processor 28 establishes a one-to-one correspondence between each of the verification characters and each of the verification features. Similar to the enrollment features, examples of the computed verification features include, but are not limited to, Intensity, Linear Predictive Coding (LPC), Perceptional Linear Predictive Coefficients (PLP), Mel-Frequency Cepstral Coefficients (MFCC), Linear Prediction Cepstral Coefficients (LPCC), Wavelet Based Features and Non-Negative Matrix Factorization features.

In a second comparison step 92, processor 28 verifies the received verification vocal input for the accessed verification character in order to authenticate user 22. To verify the verification vocal input, processor 28 matches the accessed verification character to a given enrollment character 42, thereby establishing a correspondence between the accessed verification character (and its associated verification features 50) to a given enrollment character (and its associated enrollment features 44), and compares the verification features for the accessed verification character to the enrollment features of the corresponding enrollment features. If the computed set of verification features 50 match the corresponding set of enrollment features 44, then in a third comparison step 94, processor 28 checks if there are any additional verification characters 48 in the verification string that has not yet been accessed and analyzed.

When processing verification vocal inputs containing delimiter (e.g., a dash) separated verification characters (e.g., numeric digits), processor 28 can compare the verification features for the accessed verification character to the enrollment features of the corresponding enrollment features by fitting an HMM or a DTW model to each possible verification character 48 and to the delimiter using the enrollment string of the user. In some embodiments, additional user independent models can be trained using data from other user (if available). The HMM or DTW models are used using level-building (a known dynamic programming technique) to segment the vocal inputs into verification characters and delimiters. Once the endpoints are obtained, they can used by processor 28 to perform text-dependent user recognition. In some embodiments, processor 28 can use the output of the level-building based decoder to verify the correctness of the verification vocal input(s).

Returning to step 94, if there are any additional verification characters 48 in the verification string that has not yet been accessed and analyzed, then processor 28 accesses the next verification character 48 in verification string 38 in a second access step 96, and the method continues with step 86. However, if there are no remaining additional verification characters 48 in the verification string that has not yet been accessed and analyzed, then processor 28 performs an authentication operation by validating user 22 in a first authentication step 98, and the method ends. In other words, to validate the user, all the computed verification features need to match (i.e., within a tolerance level) their corresponding enrollment features.

Returning to step 92, if the computed set of verification features 50 do not match the corresponding set of enrollment features 44, then processor 28 performs an authentication operation by failing to validate user 22 in a second authentication step 100. In other words, the user will fail validation If any all computed verification features fail to match (i.e., within the tolerance level) their corresponding enrollment features. Returning to step 88, if the accessed verification character is the delimiter, then the method continues with step 94.

The flowchart(s) and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising: defining a sequence of verification characters;
    selecting a delimiter character different from the verification characters; inserting the delimiter character between each sequential pair of the verification characters in the sequence, so as to define a verification string;
    presenting, on a display, the verification string comprising the verification and the delimiter characters, thereby prompting a user-i to recite the verification characters and the delimiter characters;

receiving, from the user via a microphone, a series of single character verification vocal inputs in response to presenting the verification string;

establishing a one-to-one correspondence between each of the single character verification vocal inputs and each of the characters in the verification string so that each of the verification characters and each of the delimiter characters have respective corresponding single character verification vocal inputs;

computing a set of verification features for each of the single character verification vocal inputs having a corresponding verification character, and ignoring the single character vocal inputs corresponding to the delimiter characters;

comparing the set of verification features of each of the single character verification vocal inputs to predetermined verification features of the corresponding single verification character in the presented verification string; and deciding, based on a result of the comparing, whether to authenticate the user for accessing a remote system, wherein the method further comprises matching each of the verification characters to a given enrollment character from a previously generated enrollment string so as to establish a correspondence between the verification characters and enrollment characters from the previously generated enrollment string, and wherein providing the indication of whether the user is authenticated based on a result of the comparing comprises comparing each of the verification features of each of the verification characters with corresponding enrollment features of the given enrolment character corresponding to the verification character.

2. The method according to claim 1, and further comprising prior to defining the verification string:

generating the enrollment string, wherein the enrollment string comprises a sequence of enrollment characters;

inserting a delimiter character between each two enrollment characters in the enrollment string, thereby updating the enrollment string;

presenting the updated enrollment string to the user;

receiving, from the user, an enrollment vocal input in response to presenting the enrollment string;

parsing the received enrollment vocal input in order to segment the enrollment vocal input into single character enrollment vocal inputs and single character delimiter vocal inputs for the enrollment vocal input; and computing a set of enrollment features for each of the single character enrollment vocal inputs, wherein the predetermined verification features comprise the enrollment features.

3. The method according to claim 2, wherein the verification characters comprise a subset of the enrollment characters.

4. The method according to claim 1, wherein providing the indication of whether the user is authenticated based on a result of the comparing comprises successfully validating the user upon all the verification features matching their corresponding enrollment features.

5. The method according to claim 1, wherein providing the indication of whether the user is authenticated based on a result of the comparing comprises failing to validate the user upon a given verification feature not matching the corresponding enrollment feature.

6. The method according to claim 1, wherein the enrollment characters comprise alphanumeric characters.

7. An apparatus, comprising: a microphone;

a display; and a processor configured: to define a sequence of verification characters, to select a delimiter character different from the verification characters, to insert the delimiter character between each sequential pair of the verification characters in the sequence, so as to define a verification string; to present, on the display, the verification string comprising the verification and the delimiter characters, thereby prompting a user-i to recite the verification and the delimiter characters, to receive, from the user via the microphone, a series of single character verification vocal inputs in response to presenting the verification string, to establish a one-to-one correspondence between each of the single character verification vocal inputs and each of the characters in the verification string so that each of the verification characters and each of the delimiter characters have respective corresponding single character verification vocal inputs, to compute a set of verification features for each of the single character verification vocal inputs having a corresponding verification character, and to ignore the single character vocal inputs corresponding to the delimiter characters, to compare the set of verification features of each of the single character verification vocal inputs to predetermined verification features of the corresponding single verification character in the presented verification string, and to decide, based on a result of the comparing, whether to authenticate the user for accessing a remote system, wherein the processor is further configured to match each of the verification characters to a given enrollment character from a previously generated enrolment string so as to establish a correspondence between the verification characters and enrollment characters from the previously generated enrolment string, and wherein the processor is configured to provide an indication of whether the user is authenticated based on a result of the comparing by comparing each of the verification features of each of the verification characters with corresponding enrollment features of the given enrolment character corresponding to the verification character.

8. The apparatus according to claim 7, wherein prior to defining the verification string, the processor is further comprised:

to generate the enrollment string, wherein the enrollment string comprises a sequence of enrollment characters, to insert a delimiter character between each two enrollment characters in the enrollment string, thereby updating the enrollment string, to present, on the display, the updated enrollment string to the user, to receive, from the user, an enrollment vocal inputs in response to presenting the enrollment string;

to parse the received enrollment vocal input in order to segment the enrollment vocal input into single character enrollment vocal inputs and single character delimiter vocal inputs for the enrollment vocal input; and to compute a set of enrollment features for each of the single character enrollment vocal inputs, wherein the predetermined verification features comprise the enrollment features.

9. The apparatus according to claim 8, wherein the verification characters comprise a subset of the enrollment characters.

10. The apparatus according to claim 7, wherein the processor is configured to provide an indication of whether the user is authenticated based on a result of the comparing by successfully validating the user upon all the verification features matching their corresponding respective enrollment features.

11. The apparatus according to claim 7, wherein the processor is configured to provide an indication of whether the user is authenticated based on a result of the comparing by failing to validate the user upon a given verification feature not matching the corresponding enrollment feature.

12. The apparatus according to claim 7, wherein the enrollment characters comprise alphanumeric characters.

13. A computer program product, the computer program product comprising:
   a non-transitory computer readable storage medium having computer readable program code embodied therewith, the computer readable program code comprising:
   computer readable program code configured to define a sequence of verification characters;
   computer readable program code configured to select a delimiter character different from the verification characters;
   computer readable program code configured to insert the delimiter character between each sequential pair of the verification characters in the sequence, so as to define a verification string;
   computer readable program code configured to present, on a display, the verification string comprising the verification and the delimiter characters, thereby prompting a user-i to recite the verification characters and the delimiter characters;
   computer readable program code configured to receive, from the user via a microphone, a series of single character verification vocal inputs in response to presenting the verification string;
   computer readable program code configured to establish a one-to-one correspondence between each of the single character verification vocal inputs and each of the characters in the verification string so that each of the verification characters and each of the delimiter characters have respective corresponding single character verification vocal inputs;
   computer readable program code configured to compute a set of verification features for each of the single character verification vocal inputs having a corresponding verification character, and ignoring the single character vocal inputs corresponding to the delimiter characters;
   computer readable program code configured to compare the set of verification features of each of the single character verification vocal inputs to predetermined verification features of the corresponding single verification character in the presented verification string;
   and computer readable program code configured to decide, based on a result of the comparing, whether to authenticate the user for accessing a remote system; and
   computer readable program code configured to match each of the verification characters to a given enrollment character from a previously generated enrolment string so as to establish a correspondence between the verification characters and enrollment characters from the previously generated enrolment string, and wherein the processor is configured to provide an indication of whether the user is authenticated based on a result of the comparing by comparing each of the verification features of each of the verification characters with corresponding enrollment features of the given enrolment character corresponding to the verification character.

14. The computer program product according to claim 13, and further comprising computer readable program code configured, prior to defining the verification string:
   to generate the enrollment string, wherein the enrollment string comprises a sequence of enrollment characters,
   to insert a delimiter character between each two enrollment characters in the enrollment string, thereby updating the enrollment string, to present the updated enrollment string to the user,
   to receive, from the user, an enrollment vocal inputs in response to presenting the enrollment string,
   to parse the received enrollment vocal input in order to segment the enrollment vocal input into single character enrollment vocal inputs and single character delimiter vocal inputs for the enrollment vocal input; and
   to compute a set of enrollment features for each of the single character enrollment vocal inputs, wherein the predetermined verification features comprise the enrollment features.

15. The computer program product according to claim 13, wherein the computer readable program code is to provide an indication of whether the user is authenticated based on a result of the comparing by successfully validating the user upon all the verification features matching their corresponding enrollment features.

16. The computer program product according to claim 13, wherein the computer readable program code is configured to provide an indication of whether the user is authenticated based on a result of the comparing by failing to validating the user upon a given verification feature not matching the corresponding enrollment feature.

17. The computer program product according to claim 13, wherein the enrollment characters comprise alphanumeric characters.

* * * * *